United States Patent
Defosse

(10) Patent No.: US 9,735,647 B2
(45) Date of Patent: Aug. 15, 2017

(54) ELECTROMAGNETIC ACTUATOR WITH MAGNETIC TORQUE LIMITER

(71) Applicant: SAFRAN ELECTRONICS & DEFENSE, Boulogne Billancourt (FR)

(72) Inventor: Xavier Defosse, Boulogne Billancourt (FR)

(73) Assignee: SAFRAN ELECTRONICS & DEFENSE, Boulogne-Billancourt (FR)

(*) Notice: Subject to any disclaimer, the term of this patent is extended or adjusted under 35 U.S.C. 154(b) by 0 days.

(21) Appl. No.: 15/320,207

(22) PCT Filed: Jun. 12, 2015

(86) PCT No.: PCT/EP2015/063246
§ 371 (c)(1),
(2) Date: Dec. 19, 2016

(87) PCT Pub. No.: WO2015/193207
PCT Pub. Date: Dec. 23, 2015

(65) Prior Publication Data
US 2017/0141647 A1    May 18, 2017

(30) Foreign Application Priority Data

Jun. 20, 2014 (FR) ................... 14 55726

(51) Int. Cl.
*H02K 7/11* (2006.01)
*H02K 7/102* (2006.01)
(Continued)

(52) U.S. Cl.
CPC ............. *H02K 7/11* (2013.01); *B64C 13/50* (2013.01); *H02K 7/003* (2013.01); *H02K 7/102* (2013.01); *H02K 2213/06* (2013.01)

(58) Field of Classification Search
CPC ........ H02K 7/11; H02K 7/112; H02K 7/1125; H02K 7/003; H02K 7/102
(Continued)

(56) References Cited

U.S. PATENT DOCUMENTS 2,939,973 A * 6/1960 Crane ................... F16D 67/06
310/100
4,663,550 A * 5/1987 Kawada ............... H02K 7/1025
310/256

(Continued)

FOREIGN PATENT DOCUMENTS

| JP | 2013176192 A * | 9/2013 |
| WO | WO 2013076158 A1 | 5/2013 |
| WO | WO 2014041143 A1 | 3/2014 |

OTHER PUBLICATIONS

Machine Translation, Okamoto, JP 2013176192 A, Sep. 5, 2013.*

*Primary Examiner* — Thomas Truong
(74) *Attorney, Agent, or Firm* — Muncy, Geissler, Olds & Lowe, P.C.

(57) ABSTRACT

An electromagnetic actuator having a body and an electric motor driving at least one motion transmission element connected to the body via a brake device, a magnetic torque limiter, and a unidirectional transmission member, the brake device including an electrical activator member so that when the activator member is powered, the unidirectional transmission member is released relative to the body. When the activator member is not powered, the unidirectional transmission member is secured to the body and opposes pivoting of the transmission element in one direction of rotation up to a maximum transmissible torque defined by the magnetic torque limiter.

8 Claims, 2 Drawing Sheets

(51) Int. Cl.
*H02K 7/00* (2006.01)
*B64C 13/50* (2006.01)

(58) Field of Classification Search
USPC .............................................. 310/92, 93, 94
See application file for complete search history.

(56) References Cited

U.S. PATENT DOCUMENTS

| | | | | |
|---|---|---|---|---|
| 5,465,815 | A | * 11/1995 | Ikegami | ................. F16D 63/00 188/164 |
| 2006/0088417 | A1 | * 4/2006 | Louis | ..................... B64C 27/50 416/142 |
| 2013/0313067 | A1 | 11/2013 | Finney | |

\* cited by examiner

ELECTROMAGNETIC ACTUATOR WITH MAGNETIC TORQUE LIMITER

BACKGROUND OF THE INVENTION

Field of the Invention

The present invention relates to moving a movable element relative to a fixed body, and more precisely it relates to an electromagnetic actuator suitable for use by way of example in aviation, and in particular for moving a flight control surface relative to the structure of an aircraft. By way of example, such a flight control surface may be an aileron, an elevon, a flap, a rudder control surface, an elevator, a spoiler . . . .

Aircraft generally comprise a fixed structure, such as a wing or a tail having flight control surfaces hinged thereto that are mounted on the fixed structure so as to pivot. Actuators connect the movable surfaces mechanically to the fixed structure and are themselves connected so as to be controlled by a control unit on which the pilot of the aircraft acts.

Description of Related Art

Actuators are known that comprise an electric motor and a motion transmission element driven by a rotor of the electric motor. Generally, in such actuators, the electric motor has a stator secured to a body that is fastened to the fixed structure, and a transmission element drives an inlet element of a transmission system such as a screw-and-nut assembly and/or stepdown gearing, with an outlet element fastened to the flight control surface so that a movement of the outlet element causes the flight control surface to pivot between a deployed position and a retracted position or a neutral position.

In the event of a failure of the motor or of its control means, depending on the type of flight control surface, it may be preferable to leave the flight control surface free to move towards one of its positions while preventing the flight control surface from moving towards the second of its positions, e.g. under the effect of aerodynamic forces. For this purpose, the transmission assembly generally includes an overrunning clutch or "freewheel" that can become clutched in the event of motor failure in order to oppose pivoting of the transmission element in the direction corresponding to the flight control surface moving towards its second position.

When the freewheel is clutched, the flight control surface tending to move towards its deployed position exerts a torque on the transmission element, which torque is transmitted to the body. Under certain circumstances, the torque can be large and risks damaging the entire transmission system all the way to the structure of the aircraft.

BRIEF SUMMARY OF THE INVENTION

An object of the invention is to remedy that drawback.

To this end, the invention provides an electromagnetic actuator comprising a fixed body, an electric motor having a stator fastened to the body, and at least one motion transmission element rotatably connected to a rotor of the motor, said element being connected to the fixed body via a brake device and a unidirectional transmission member. The actuator includes a magnetic torque limiter and the brake device comprises an electrical activator member so that when the activator member is powered, the unidirectional transmission member is released relative to the body, and when the activator member is not powered, the unidirectional transmission member is secured to the body and opposes pivoting of the transmission element in one direction of rotation up to a maximum transmissible torque defined by the magnetic torque limiter.

In the event of excessive torque, the torque limiter allows the transmission element to slide relative to the body, thereby limiting any risk of damaging the body. The use of a magnetic torque limiter is particularly advantageous since there is no friction and the characteristics of the limiter vary little with temperature (over a temperature range appropriate for the applications of such an actuator, e.g. −40° C. to +79° C.). As a result, the limiter gives rise to little dispersion, where such dispersion could be very harmful and more particularly in actuators that present a large transmission ratio that would tend to amplify any dispersion.

Advantageously, the magnetic torque limiter is mounted between the body and the unidirectional transmission member.

This embodiment has a structure that is particularly compact and makes it possible to incorporate the brake device, the unidirectional transmission member, and the magnetic torque limiter in a single subassembly.

Preferably, the magnetic torque limiter is mounted between the brake device and the unidirectional transmission member.

This arrangement makes it simple to incorporate the magnetic torque limiter.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

Figure 1:
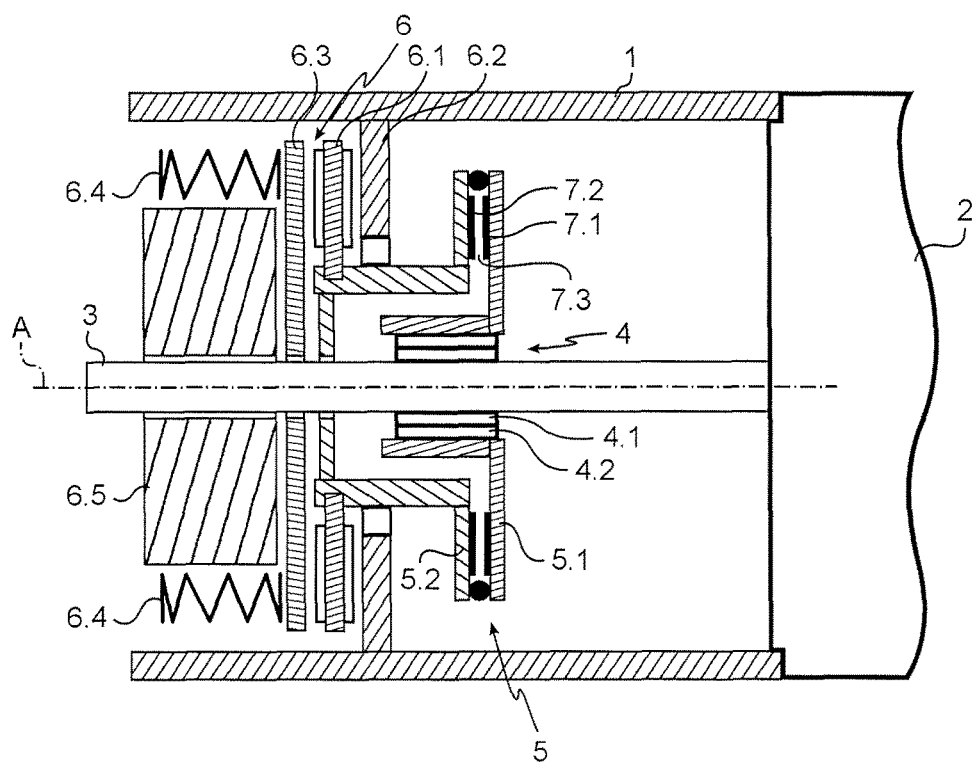
FIG. 1 is a diagrammatic longitudinal section view of an actuator in a first embodiment of the invention.

The actuator of the invention is described herein in an application to moving a flight control surface relative to the structure of an aircraft. The flight control surface is movable between a deployed position and a neutral or retracted position.

With reference to the figures, the electromechanical actuator comprises a body 1 and an electric motor 2 having a stator fastened to the body 1 and a rotor rotatably connected to a motion transmission element.

The body 1 has conventional means for fastening it to the structure of an aircraft.

The electric motor 2 is powered by a control unit (not shown) that is connected to the electricity network of the aircraft for its own power supply and for powering the actuator, and that is connected to the cockpit of the aircraft to receive orders therefrom for deploying or retracting the flight control surface.

In this example, the motion transmission element is a shaft 3 pivotally mounted in the body 1 and connected to the flight control surface via a motion transmission assembly (not shown). By way of example, the motion transmission assembly comprises a stepdown device and/or a motion transformation device such as a screw-and-nut assembly, and has an inlet element rotatably connected to the shaft 3 and an outlet element e.g. connected to the free end of a lever that is connected to the flight control surface. The shaft 3 is guided in rotation relative to the body 1 by bearings (not shown) and it is connected to the body 1 via a unidirectional transmission member, specifically in this example a freewheel given overall reference 4, a torque limiter given overall reference 5, and a brake device given overall reference 6.

The freewheel 4 comprises an inner portion 4.1 secured to the shaft 3, an outer portion 4.2 pivotally mounted on the inner portion 4.1, and a ratchet assembly allowing the outer portion 4.2 to turn in only one direction of rotation.

The torque limiter 5 is a magnetic torque limiter having a first plate 5.1 provided with a first series of magnets 7.1 and a second plate 5.2 provided with a second series of magnets 7.2. The first plate 5.1 is fastened to the outer portion 4.2 of the freewheel 4, and the second plate 5.2 is connected to rotate with an inner ring 6.1 of the brake device 6. The first series of magnets 7.1 extends substantially facing the second series of magnets 7.2 and is spaced apart therefrom by an airgap 7.3. The magnetic field produced by the magnets and the width of the airgap 7.3 define a maximum torque that can be transmitted from the first plate 5.1 to the second plate 5.2. Sealing means are provided to prevent particles collecting on the magnets and interfering with the operation of the torque limiter 5.

In addition to the movable ring 6.1, the brake device 6 has an outer ring 6.2 that is rigidly fastened to the body 1 (more precisely, the outer ring 6.2 in this example is a portion of the body 1) and an outer ring 6.3 fastened to the body 1 with axial clearance. The inner ring 6.1 is fastened with axial clearance to the second plate 5.2 (the inner ring 6.1 is more precisely engaged in a fluted portion of the second plate 5.2) and has a portion with faces that are each provided with a friction lining and that extend between friction linings carried by the outer rings 6.2 and 6.3. Springs 6.4 extend between the body 1 and the outer ring 6.3 to clamp the inner ring 6.1 between the outer rings 6.3 and 6.2. The brake device 6 also has an electrical activator member 6.5 in the form of a solenoid dimensioned so that when it is powered it attracts the outer ring 6.3 and moves it away from the inner ring 6.1 against the force exerted by the springs 6.4.

In operation, when the activator member 6.5 is powered, the shaft 3 can pivot in both directions of rotation (it should be observed that in the direction passed by the freewheel 4, the motor 2 delivers little or no drive to the inner ring 6.1 and the torque limiter 5) and, when the activator member 6.5 is not powered, the freewheel 4 opposes rotation of the shaft 3 in one of the two directions of rotation.

Thus, when the activator member 6.5 is powered, the electric motor 2, which is also powered, drives the shaft 3 to turn in either of its directions of rotation. When the activator member 6.5 is not powered, the electric motor 2 is likewise not powered so that only aerodynamic forces acting on the flight control surface can cause the shaft 3 to pivot. Because of the freewheel 4 opposing turning of the shaft 3 in one of the two directions of rotation, the shaft 3 prevents the flight control surface from moving away from its neutral position towards its deployed position, whereas the flight control surface is left free to move towards its neutral position. Nevertheless, if the aerodynamic forces acting on the flight control surface exert a torque on the shaft 3 that is greater than the maximum torque that can be transmitted between the plates 5.1 and 5.2 of the torque limiter 5, the first plate 5.1 will pivot relative to the second plate 5.2, thus allowing the shaft 3 to turn and allowing the flight control surface to move towards its deployed position. As a result, the torque limiter 5 limits the torque that can be transmitted to the structure of the aircraft and to the body 1 via the shaft 3, the freewheel 4, and the brake device 6 when the activator member is not powered.

With reference to FIG. 1, and in the first embodiment, the airgap 7.3 extends in a plane perpendicular to the axis of rotation A of the shaft 3.

In this example, the first plate 5.1 is in the shape of a disk that is perpendicular to the axis A and that is pierced at its center to be fastened on a bushing secured to the outer portion of the freewheel 4.

The second plate 5.2 is also in the form of a disk that is perpendicular to the axis A and that is pierced at its center so as to be fastened to a bushing pivotally received in a bearing fastened to the body 1. The end portion of the bushing remote from the second plate 5.2 is fluted to receive the inner ring 6.1 in axial sliding.

Figure 2:
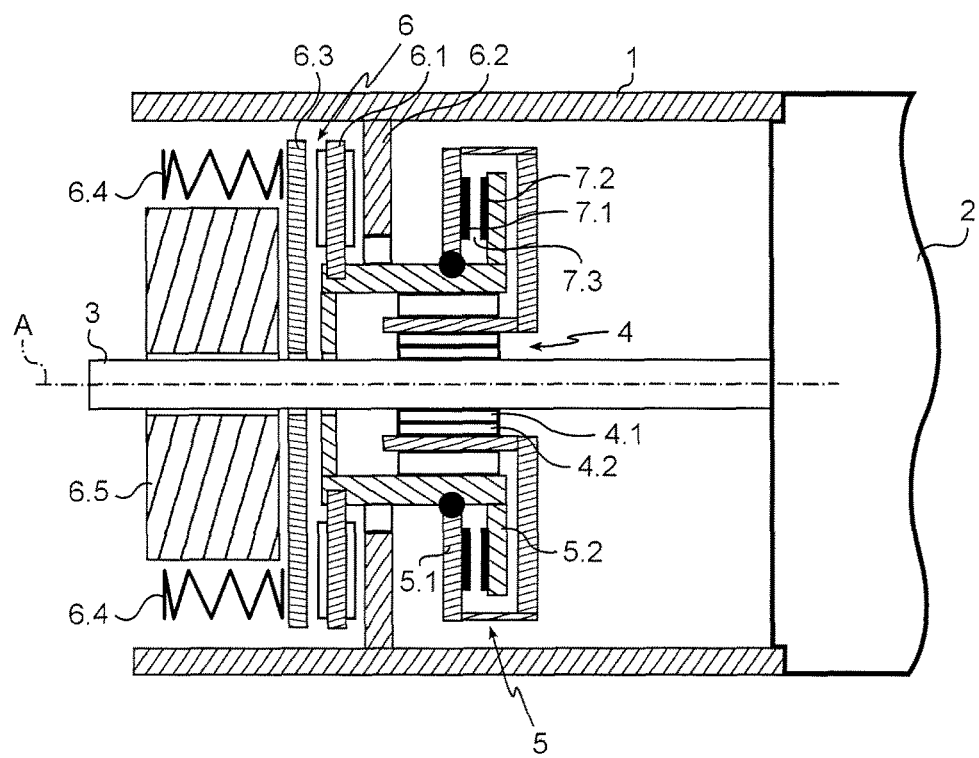
FIG. 2 is a view analogous to FIG. 1 showing a variant of the first embodiment.

In the variant of FIG. 2, the second plate 5.2 has the same shape as above.

In this variant, the first plate 5.1 is in the form of an annulus centered on the axis A. The first plate 5.1 has an inner edge that extends around the bushing of the second plate 5.2 leaving a space that is occupied by a sealing gasket, and an outer edge that is fastened to the collar of a bushing secured to the outer portion of the freewheel 4. A bearing is mounted between the bushing of the second plate 5.2 and the bushing of the first plate 5.1.

The second plate 5.2 is also in the form of a disk that is perpendicular to the axis A and that is pierced at its center in order to be fastened on a bushing pivotally received in a bearing fastened to the body 1. The end portion of the bushing remote from the second plate 5.2 is fluted for receiving the inner ring 6.1 in axial sliding.

Figure 3:
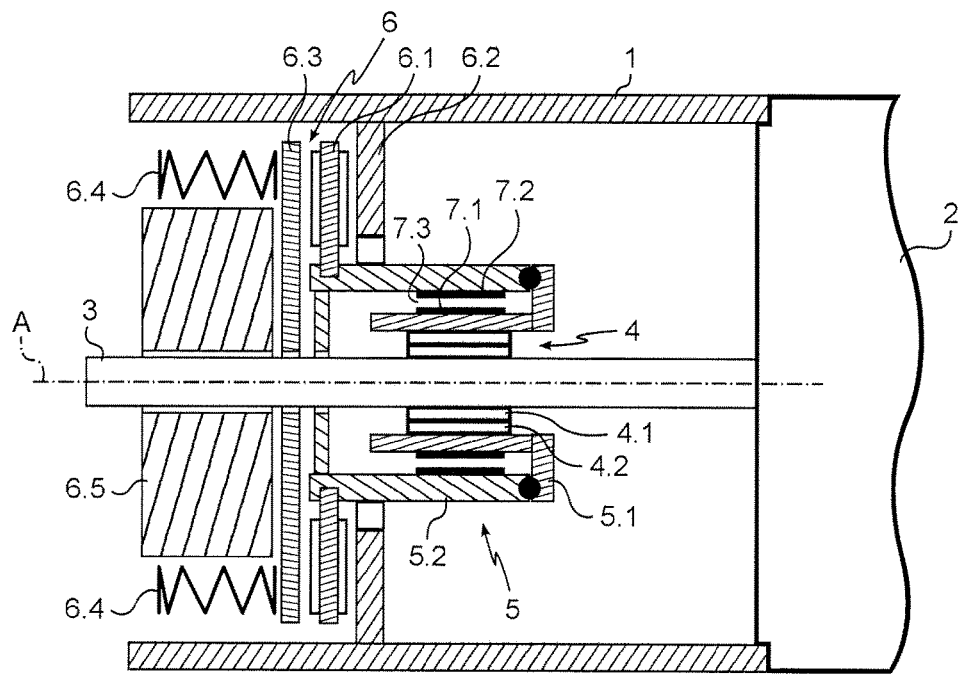
FIG. 3 is a diagrammatic longitudinal section view of an actuator in a second embodiment of the invention.

With reference to FIG. 3 and in a second embodiment, the airgap 7.3 extends in a cylindrical surface centered on the axis of rotation A of the shaft 3.

In this embodiment, the first plate 5.1 is in the form of a tube centered on the axis A and fastened to the outer portion of the freewheel 4.

The second plate 5.2 is also in the form of a tube centered on the axis A: the second plate 5.2 surrounds the first plate 5.1 and is pivotally received in a bearing secured to the body 1. The end portion of the second plate 5.2 is fluted to receive the inner ring 6.1 in axial sliding.

Sealing gaskets are mounted between the plates 5.1 and 5.2 to oppose particles penetrating into the airgap 7.3.

Figure 4:
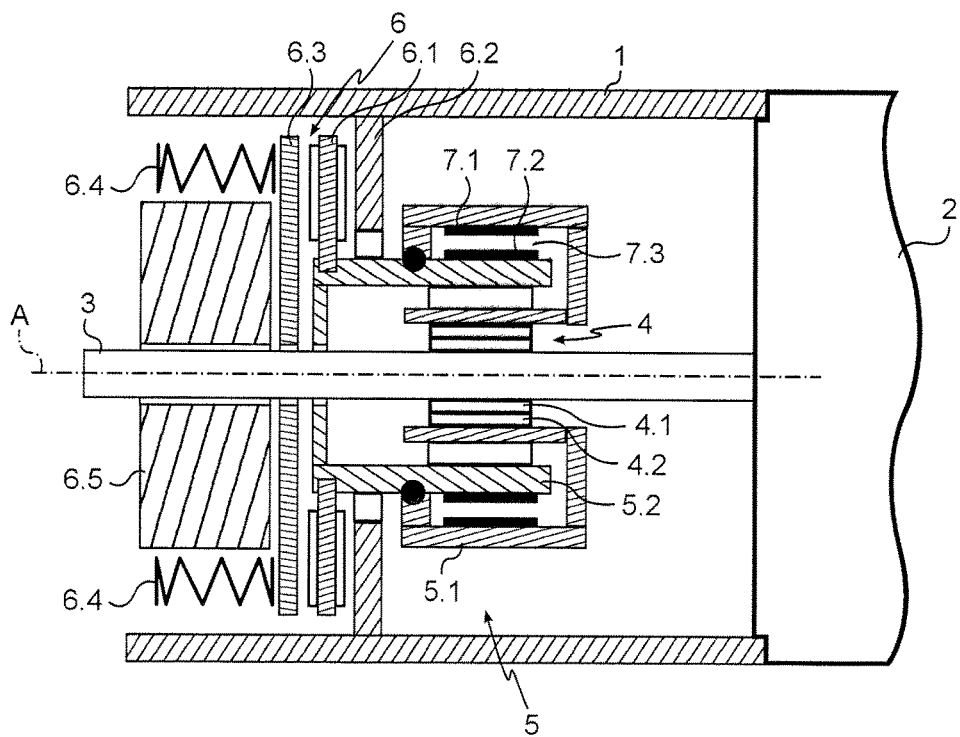
FIG. 4 is a view analogous to FIG. 1 showing a variant of the second embodiment.

In the variant of FIG. 4, the second plate 5.2 has the same shape as above.

The first plate 5.1 is likewise of annular shape centered on the axis A, but it extends around the second plate 5.2. The first plate 5.1 has one end carried by a collar secured to a bushing secured to the outer portion of the freewheel 4. A bearing is mounted between the bushing of the second plate 5.2 and the bushing of the first plate 5.1.

Naturally, the invention is not limited to the embodiments described but covers any variant coming within the ambit of the invention as defined by the claims.

In particular, the magnetic torque limiter may be mounted downstream from the one-way transmission member or between the brake device and the body.

The one-way transmission member may make use of pawls, rollers, or of chocking elements.

The invention claimed is:

1. An electromagnetic actuator comprising a body, an electric motor having a stator fastened to the body, and at least one motion transmission element, rotatably connected to a rotor of the motor, said transmission element being connected to the body via a brake device and a unidirectional transmission member, the actuator comprises a magnetic torque limiter and the brake device comprises an electrical activator member so that when the activator member is powered, the unidirectional transmission member is released relative to the body, and when the activator member is not powered, the unidirectional transmission member is secured to the body and opposes pivoting of the transmission element in one direction of rotation up to a maximum transmissible torque defined by the magnetic torque limiter.

2. The actuator according to claim 1, wherein the magnetic torque limiter is mounted between the body and the unidirectional transmission member.

3. The actuator according to claim 2, wherein the magnetic torque limiter is mounted between the brake device and the unidirectional transmission member.

4. The actuator according to claim 3, wherein the magnetic torque limiter comprises a first series of magnets secured to a first portion connected to rotate with a first portion of the unidirectional transmission member, and a second series of magnets secured to a second portion connected to rotate with a first portion of the brake device, the first series of magnets substantially facing the second series of magnets and being spaced apart therefrom by an airgap.

5. The actuator according to claim 4, wherein the airgap extends in a plane perpendicular to an axis of rotation (A) of the transmission element.

6. The actuator according to claim 4, wherein the airgap extends in a cylindrical surface centered on an axis of rotation (A) of the transmission element.

7. The actuator according to claim 4, including sealing means for preventing particles penetrating into the airgap between the magnets of the magnetic torque limiter.

8. The actuator according to claim 1, wherein the unidirectional transmission member is a freewheel.

* * * * *